Feb. 26, 1935.　　　　J. SNEED　　　　1,992,449
TOGGLE MECHANISM
Original Filed March 16, 1929　　2 Sheets-Sheet 1

Inventor
JOHN SNEED.
By Richey & Watts
Attorney

Feb. 26, 1935. J. SNEED 1,992,449
TOGGLE MECHANISM
Original Filed March 16, 1929 2 Sheets-Sheet 2
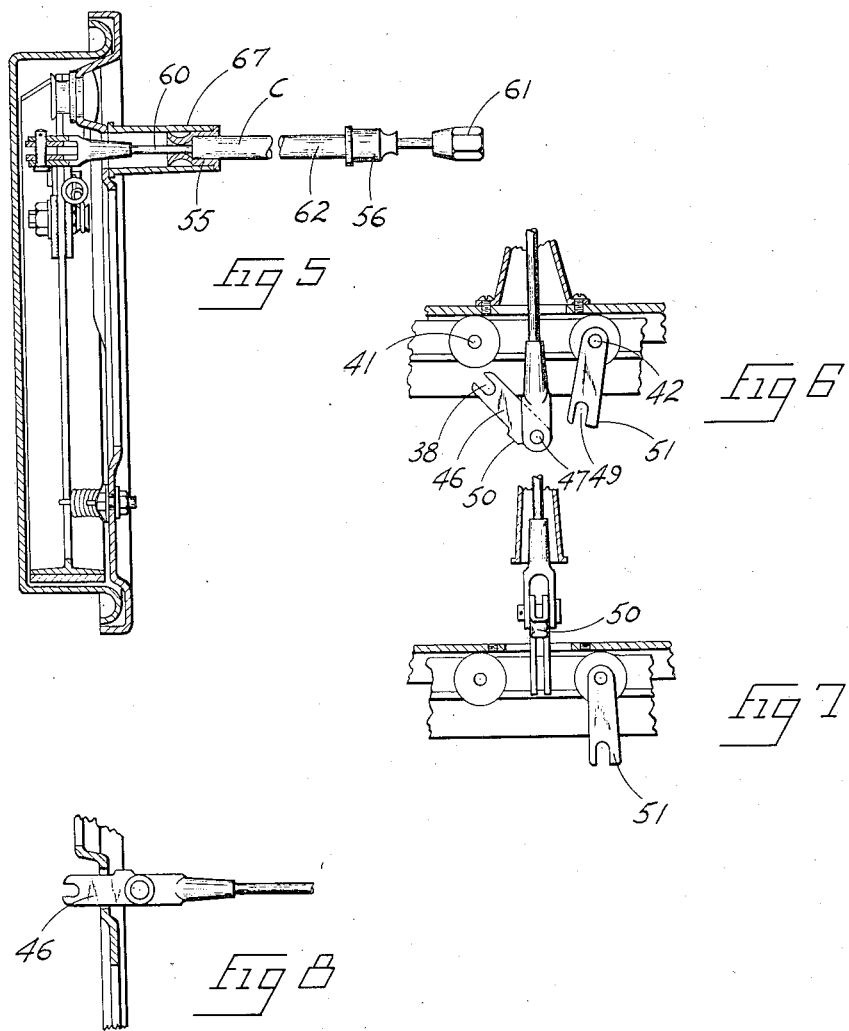

Patented Feb. 26, 1935

1,992,449

UNITED STATES PATENT OFFICE 1,992,449

TOGGLE MECHANISM

John Sneed, Grosse Pointe Shores, Mich., assignor to The Midland Steel Products Company, Cleveland, Ohio, a corporation of Ohio, trustee for Steeldraulic Brake Corporation, Detroit, Mich., a corporation of Michigan Original application March 16, 1929, Serial No. 347,515. Divided and this application September 29, 1931, Serial No. 565,749

13 Claims. (Cl. 188—78)

This invention relates to vehicle brakes and has to do, more particularly, with a novel form of expanding mechanism for separating the ends of the brake shoe.

This application constitutes a division of my co-pending application, Serial No. 347,515, filed March 16, 1929, for Vehicle brakes.

It is among the objects of this invention to provide a spreading or shoe-expanding means which may be easily assembled or disassembled, which may be expeditiously mounted between the ends of the shoe or quickly knocked down and removed therefrom.

Another object of this invention is to provide a spreading or shoe-expanding means in which friction losses are reduced to a minimum and which has a novel arrangement of parts giving an additional range of movement beyond normal dead center of the toggle.

Another object of this invention is to provide a novel form of toggle for spreading the ends of the brake shoe that is extremely simple in construction and which may be readily and easily manufactured at a minimum cost.

Another object of this invention is to provide a toggle that may be arranged between the shoe ends without undue labor or a partial dismantling of the brake, thereby permitting the device to be readily inserted as well as removed from between the ends of the brake shoe for the purposes of repair, in a manner that is equally expeditious.

This invention contemplates a brake expanding device which takes the form of a toggle mechanism made up of toggle arms easily separated for the purpose of removing at least a portion of the toggle from co-operative engagement with the brake shoe. In its preferred form the toggle consists of a male arm and a female arm, the male arm being pivotally connected to one of the shoe ends and having a bifurcated portion removably engaging with the toggle center pin and a female arm that pivotally engages with the center pin and removably engages the opposing shoe end. The center pin is operatively connected to the flexible cable or other tension member for operating the toggle mechanism.

To "knock down" the toggle it is only necessary to disengage the female arm from the thrust pin at its end of the shoe, thereby permitting the center pin and toggle to be moved out of engagement with the bifurcated portion of the male arm. Then the flexible cable may be withdrawn from the apron, which allows the withdrawal from the brake proper of that portion of the toggle attached thereto. To reassemble the toggle, the parts are replaced in a manner just the reverse of that described.

Other and further objects and advantageous features of this invention will be hereinafter brought out, reference being had to the accompanying drawings and written description, wherein like characters of reference designate corresponding parts, and wherein:

Fig. 5 is a vertical section taken along the line 5—5 of Fig. 2.

Fig. 6 is a view showing the parts of the toggle mechanism after separation.

Fig. 7 is a view similar to that of Fig. 6, showing a portion of the toggle being withdrawn from the brake.

Fig. 8 shows the end of the flexible cable and the portion of the toggle mechanism secured thereto.

Figure 1:
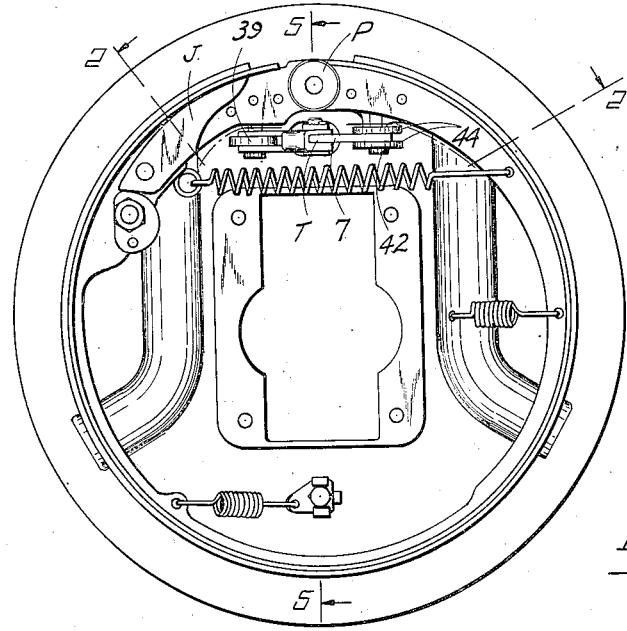
Fig. 1 is an elevation of the assembled parts constituting the brake with which my novel form of toggle mechanism is employed.
Figure 2:
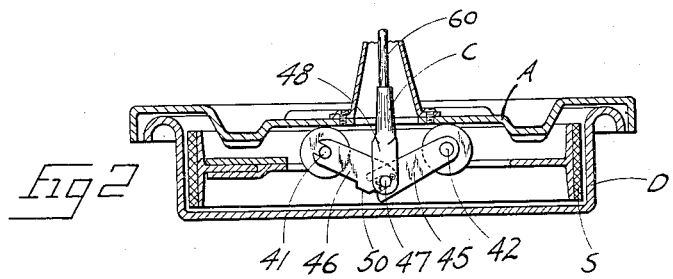
Fig. 2 is a horizontal section taken along the line 2—2, Fig. 1.

Referring to the drawings, particularly Figs. 1 and 2, I have shown the preferred form of my toggle mechanism as mounted in conjunction with the usual drum D, within which is preferably mounted a substantially annular brake shoe S carrying suitable lining material, that is adapted to be expanded into frictional engagement with the brake drum. Closing the open face of the drum and supporting the brake shoe is an apron or backing plate A which carries an anchor pin P with which the opposite ends of the shoe engage in idle position. Depending upon the direction of drum rotation, one or the other of the shoe ends will deliver brake torque to the anchor. This brake also includes an adjustor J carried by one end of the shoe and is movable circumferentially thereof to vary the effective length of such shoe.

My toggle mechanism T is preferably arranged in a horizontal position between the ends of the shoe and has its outer ends engaging with the thrust pins 41 and 42 mounted at such ends respectively. The toggle serves to force the shoe ends apart and expand the brake into engagement with the drum. The mid-portion of the toggle is connected to a flexible control C including a cable and a flexible conduit that will be hereinafter described more in detail along with the detail description of the toggle mechanism and its operation. Of course, it will be understood that retractor springs are provided to draw the shoe onto the anchor and hold it out of contact with the drum when in idle position.

Such parts of the brake as the particular shoe, the adjustor, the apron or backing plate, etc. have all been described more or less in detail in my co-pending application, Serial No. 347,515, filed March 16, 1929. Inasmuch as this description will be directed primarily thereto such parts as those just mentioned hereinabove will not be dealt with in detail.

Referring again to the toggle, it will be noted that it consists of a male arm 45 pivotally connected to a thrust pin 42 at one end and has its other end bifurcated as at 49, Fig. 6, which bifurcated end slidably engages the toggle pivot pin 47. The female arm of the toggle, indicated by the numeral 46 comprises upper and lower parts folded over and joined together by portion 50, Fig. 7, which bridges both parts. The inner end of the female arm is pivotally connected to the toggle center pin 47 and has its outer end bifurcated as at 38 (Fig. 6) slidably and pivotally to engage a thrust pin 41, such pin being disposed opposite the thrust pin 42 and being seated in the adjustor J.

The thrust pins 41 and 42 perform the dual function of engaging the ends of the toggle T and of carrying rollers which space the shoe ends laterally from the apron and make for a rolling support thereon. Each of the pins 41 and 42 have enlarged heads. The pin 42 mounted on the end of the shoe carries a freely rotating pair of rollers 44, one above and one below the male toggle arm 45. The pin 41 carries a freely rotating roller 39 and pivotally and slidably receives, on both sides of the roller, the bifurcated ends of the female toggle arm 46.

Figure 3:
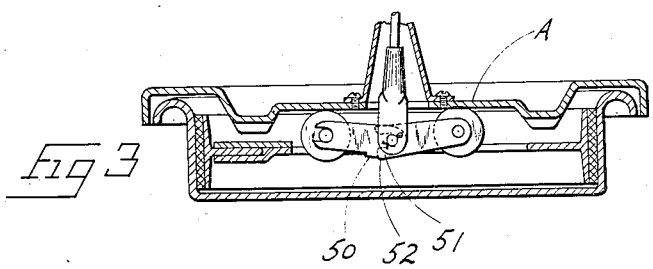
Figs. 3 and 4 are views similar to that of Fig. 2, showing the parts as they are displaced during the spreading of the toggle mechanism.

The inner ends of the toggle arms, as heretofore mentioned, engage a common pivot pin 47 which is in turn engaged by a yoke 48 connected to an actuating cable 60. Tension on the cable, see Figs. 2 and 3, tends to flatten the toggle and spread the shoe ends, at the same time exerting a lateral force through the pins 41 and 42 in the direction of the apron. As the shoe ends are moved apart the rollers roll along the apron so that the shoe ends are spread with a minimum of frictional resistance.

As mentioned, the male toggle arm 45 pivotally engages one end of the shoe, whereas the opposing end is bifurcated and pivotally and slidably engages the center pin of the toggle. However, the female arm 46 is pivotally and slidably engaged with the thrust pin 41 and is pivotally mounted on the toggle center pin. This arrangement permits, in the assembly of the brake, the female toggle arm to be passed through an opening in the apron, Fig. 8, in position to have its bifurcated end engage the thrust pin 41, and the male toggle arm is in such position as to receive the pivot pin 47 of the toggle, see Fig. 6. To disassemble the parts the procedure is necessarily the reverse, that is to say, the yoke may be moved into the drum until such time as the bifurcated end 38 of the female arm disengages with the thrust pin 41 and the bifurcated end 49 of the male arm swings clear of the toggle center pin 47.

Figure 4:
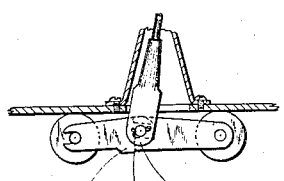

As hereinbefore related, the yoke 48 is secured to a cable 60 and the brake is expanded by a force putting the cable in tension. This tends to expand the toggle to a position, as that shown in either Fig. 3 or 4, in which continued movement of the yoke might pull the toggle over dead center, thus rendering the brake inoperative. However, the extreme inner end 51 of the male arm 45 engages with the offset or bridge 50 of the female arm 46 and further inward movement of the yoke changes the pivot point of the toggle from the axis of the pin 47 to the point of contact 52 between the parts 50 and 51 of the inner ends of the female and male toggle arms respectively. This prevents the toggle from being pulled over dead center and the subsequent failure of the brake.

The yoke 48 is secured to a cable 60 which in turn carries at its other end a connecting part 61 which may be secured to the brake operating linkage, carried by the chassis in the usual manner. The cable may be deemed part of the flexible control C, mentioned above, and considering the control as a whole, it also includes a flexible conduit or housing 62, cupped end fittings 55 and 56 and tubular bracket 67 detachably secured to the apron. All of these parts have been separately described in my co-pending application, Serial No. 347,515, and will not be taken up in detail in this application.

Needless to say, with my improved form of toggle mechanism it will be possible quickly and easily to arrange the toggle between the shoe ends in operative position. Likewise, it will be but a simple matter to produce the disengagement of the open ends of the male and female arms with their respective pivot pins to permit the disassembly of the toggle and the removal of the yoke 48 and the female arm 46 from the drum. The male arm, of course, remains within the drum by reason of its pivotal engagement with the end of the brake shoe.

Thus it will be seen that my invention lends itself to ease and economy of manufacture and assembly, as well as to increased safety and ease of operation of the brake. While the foregoing describes a preferred form of my invention, modifications and improvements may occur to those skilled in the art all within the major precepts of my invention. Thus I do not care to be limited to the specific disclosure hereof or in any manner other than by the claims appended hereto.

I claim:—

1. Spreading mechanism for a brake comprising a toggle having a center pivot pin and oppositely extending arms engaging said pin, one of said arms being pivotally and permanently engaged therewith and the other of said arms being pivotally, slidably and detachably engaged therewith.

2. Spreading mechanism for a brake comprising a toggle having a center pivot pin and oppositely extending arms engaging said pin, one of said arms having a bifurcated end for slidably engaging said pin, the other of said arms pivotally engaging said pin and having a bifurcated end adapted to slidably engage with a thrust pin on said brake.

3. Spreading mechanism for a vehicle brake having brake shoes which comprises a pivot pin, oppositely extending arms engaging said pin, one of said arms being permanently connected to a brake shoe and demountably connected to the toggle pivot pin.

4. Spreading mechanism for a brake comprising a toggle having a center pin, oppositely extending arms engaging said pin, one of said arms having a thrust bearing on the brake shoe and being demountably connected to said pin, the other of said arms being demountably connected to the opposing end of said brake shoe and permanently connected to the pin.

5. In combination a friction device, a toggle comprising a pair of arms for actuating the friction device and a control for actuating said toggle, one of the toggle arms being permanently pivotally connected to the friction device, the other of said arms being pivotally connected to the control and detachably connected to the first named toggle arm and constituting with said control a detachable sub-assembly.

6. A brake comprising a friction device, a toggle comprising a pair of arms actuating the friction device and a control for actuating said toggle, one of the toggle arms being pivotally connected to the friction device and detachably connected to the other of said arms, the other of said arms being pivotally connected to said control and detachably connected to said friction device and constituting with said control a detachable sub-assembly.

7. A toggle mechanism for spreading the ends of a brake shoe which comprises a center pivot pin having oppositely extending arms, one of said arms being connected to the end of the brake shoe and having a bifurcated end for slidably engaging the pin, both of said arms having parts near the pivot pin adapted to contact as the toggle approaches dead center for establishing a new pivot point to permit further expansion of the toggle.

8. Spreading mechanism for a brake comprising a toggle having a center pivot pin and oppositely extending arms engaging said pin, one of said arms having a bifurcated end for slidably engaging said pin, the other of said arms comprising two parts connected by an integral part near its inner end, the inner end of the first arm lying between the parts of the other arm and having a part engageable with the connecting part of the other arm to establish a secondary pivot point as the toggle approaches dead center.

9. In a brake the combination of a friction device having separable ends, toggle mechanism for spreading said ends including a pivot pin and arms extending from said pin to said separable ends of the friction device respectively, and a control for actuating said toggle pivotally and permanently attached to said pivot pin, one of said toggle arms being pivotally and permanently attached to one of said separable ends of the friction device and slidably and removably attached to said pivot pin, the other of said arms being pivotally and permanently attached to said pivot pin and slidably and removably attached to the other of said shoe ends, both said arms having parts coacting prior to the approach of the toggle to dead center to prevent collapse thereof, and said control, toggle pin and toggle arm attached thereto comprising a separately removable sub-assembly.

10. In combination with a friction device, a toggle for actuating said friction device including a central pivot pin and a pair of oppositely extending arms, and a control for actuating said toggle, one of said arms being permanently attached to said control and detachably connected to the friction device, the other of said arms permanently attached to said friction device.

11. Spreading mechanism for a brake shoe comprising a toggle having a center pivot pin and oppositely extending arms engaging said pin, one of said arms slidably engaging said pin, the other of said arms being permanently attached to said pivot pin and slidably connected to said brake, one of said arms having a part engageable with the other arm to establish a secondary pivot point as the toggle approaches dead center.

12. Spreading mechanism for a brake comprising a toggle having a center pivot pin and a pair of oppositely extending arms and means associated with at least one of said arms and cooperating with the other for establishing a secondary pivot point as the toggle approaches dead center.

13. Spreading mechanism for a brake comprising a toggle having a center pivot pin, a control permanently attached to said pivot pin, an arm permanently attached to said pivot pin and detachably connected to said brake, a second arm permanently connected to said brake and detachably connected to said pivot pin, and means for establishing a new pivot point for said toggle associated with at least one of said arms.

JOHN SNEED.